US012429075B2

(12) United States Patent

Mazzi et al.

(10) Patent No.: US 12,429,075 B2

(45) Date of Patent: Sep. 30, 2025

(54) HYDRAULIC ACTUATOR WITH DUAL PNEUMATIC OPERATION APPLIED AS HYDRAULIC ACTUATION FOR HYDROELECTRIC POWER PLANTS

(71) Applicants: METAL TECNICA BOVENAU LTDA, Rio do Sul (BR); REIVAX AUTOMACAO E CONTROLE, Florianopolis (BR); RIO PARANAPANEMA ENERGIA S.A, Sao Paulo (BR); UNIVERSIDADE FEDERAL DE SANTA CATARINA, Florianopolis (BR)

(72) Inventors: Claudio Mazzi, Rio do Sul (BR); Gregori Picolotto Conterato, Florianopolis (BR); Leonardo Augusto Weiss, Florianopolis (BR); Talles Augusto Bragagnolo Spada, Erechim (BR); Thiago Luchtenberg Sehnem, Rio do Sul (BR); Victor Andre Odebrecht, Rio do Sul (BR); Victor Juliano De Negri, Florianopolis (BR); Vinicius Vigolo, Florianopolis (BR)

(73) Assignees: METAL TECNICA BOVENAU LTDA, Rio do Sul (BR); RIO PARANAPANEMA ENERGIA S.A, Sao Paulo (BR); REIVAX AUTOMACAO E CONTROLE, Florianopolis (BR); UNIVERSIDADE FEDERAL DE SANTA CATARINA, Florianopolis (BR)

( * ) Notice: Subject to any disclaimer, the term of this patent is extended or adjusted under 35 U.S.C. 154(b) by 0 days.

(21) Appl. No.: 18/577,750

(22) PCT Filed: Dec. 5, 2023

(86) PCT No.: PCT/BR2023/050436

§ 371 (c)(1),
(2) Date: Jan. 9, 2024

(87) PCT Pub. No.: WO2024/119257

PCT Pub. Date: Jun. 13, 2024

(65) Prior Publication Data

US 2025/0092887 A1 Mar. 20, 2025

(30) Foreign Application Priority Data

Dec. 8, 2022 (BR) .......................... 2020220251563

(51) Int. Cl.
*F15B 15/20* (2006.01)
*F15B 21/08* (2006.01)
(Continued)

(52) U.S. Cl.
CPC ............ *F15B 15/20* (2013.01); *F15B 15/202* (2013.01); *F15B 21/08* (2013.01); *F15B 13/0814* (2013.01); *F15B 15/18* (2013.01)

(58) Field of Classification Search
CPC ........ F15B 15/202; F15B 15/18; F15B 21/08; F15B 13/0814
See application file for complete search history.

(56) References Cited

U.S. PATENT DOCUMENTS 4,630,441 A * 12/1986 Chamberlain ........ B64C 13/504 60/391
5,117,633 A * 6/1992 Bayer ................ F15B 11/0725 60/473

(Continued)

FOREIGN PATENT DOCUMENTS

KR 20120112315 A 10/2012

*Primary Examiner* — Dustin T Nguyen

(74) *Attorney, Agent, or Firm* — LUCAS & MERCANTI, LLP

(57) ABSTRACT

A hydraulic actuator with dual pneumatic operation, used in hydroelectric power plants, specifically in the field of hydro- (Continued)

pneumatic units generating hydraulic pressure for the operation of intake valves of hydroelectric power plants. The hydropneumatic actuator (1) comprises a hydropneumatic block (2) featuring two pneumatic pumps (4 and 4a) fixed to the base (32). This block accommodates the cup assembly (36), within which resides a cylinder (37) housing the plunger guide (38). The plunger guide (38) is attached to the shaft end (39), which is securely and firmly fastened to the cup end (36) using a guide nut (40). The hydraulic actuator (47) can be articulated by fitting the female eyelet (48) into the male eyelet (50), both of which being secured by the pin (51).

4 Claims, 5 Drawing Sheets

(51) Int. Cl.
*F15B 13/08* (2006.01)
*F15B 15/18* (2006.01)

(56) References Cited

U.S. PATENT DOCUMENTS

| | | | | |
|---|---|---|---|---|
| 6,282,893 | B1 * | 9/2001 | Porter | F15B 1/265 92/110 |
| 10,066,647 | B2 * | 9/2018 | Garcia | F15B 13/0839 |
| 11,181,127 | B2 * | 11/2021 | Asahara | F15B 13/0839 |
| 11,746,764 | B2 * | 9/2023 | Nema | F04B 9/133 417/404 |
| 2017/0363116 | A1 * | 12/2017 | Huang | F15B 13/0835 |

* cited by examiner

HYDRAULIC ACTUATOR WITH DUAL PNEUMATIC OPERATION APPLIED AS HYDRAULIC ACTUATION FOR HYDROELECTRIC POWER PLANTS

CROSS REFERENCE TO RELATED APPLICATION

This Application is a 371 of PCT/BR2023/050436 filed on Dec. 5, 2023 which, in turn, claimed the priority of Brazilian patent application No. 2020220251563 filed on Dec. 8, 2022, the contents of each of which are incorporated herein by reference.

FIELD OF THE INVENTION

The present utility model patent application refers to a hydraulic actuator with dual pneumatic operation that we will henceforth refer to as a hydropneumatic actuator. The object of this patent application will be applied in hydroelectric power plants, specifically in the field of hydropneumatic units generating hydraulic pressure for the operation of intake valves of hydroelectric power plants.

BACKGROUND OF THE INVENTION

Hydraulic pressure generator units are typically applied in the design of jacks, winches, presses, cylinders and other hydraulic equipment, to raise the internal hydraulic pressure in pressure vessels.

These hydraulic pressure generator units are widely used in the state of the art, including in the operation of intake valves of hydroelectric power plants.

In addition, these operations consist of opening and closing inlet sluices and water spillways, as well as the regulation and protection of hydroturbines and generators.

Currently, this function has been performed by commonly marketed hydraulic cylinders, which require hydraulic units. This arrangement of components results in construction complexity, elevated electricity consumption, and increased costs compared to the current utility model. Additionally, the current system has a great environmental impact, resulting from the manufacturing processes and the large volume of oil required for its operation.

Thus, it is important to analyze each aspect of the operation, the system currently in use exhibits low efficiency due to the structural arrangements and configurations commonly known in the state of the art, which are inherently associated with high installation, operational, and maintenance costs. It is also necessary to comment on the complexity of its redundancy pathways, and the robustness of the means for operating the current system, such as compressors, generators, hydraulic power plants etc.

Another solution that the present improvement brings to light is that the system can be equipped with a pneumatic lung in the event of a power outage, thus making it possible to close the sluice in an emergency situation where there is no electric power.

An interesting fact to mention is the decrease in the capacity of the other components due to the simplicity of the system, for example, it is possible to use compressors, generators and transformers of lower capacity, resulting in economic competitiveness of the present improvement.

The object of this utility model seeks to provide a solution to these state of the art problems by applying a hydropneumatic system as a hydraulic actuation for the operation of intake valves of hydroelectric power plants that can bring simplicity, technology, environmental awareness and especially a better and safer operation of the sluice of hydroelectric plants.

This utility model also aims to provide a technically, economically and ecologically viable option in relation to the one known in the previous art.

Document KR101570665B1 is a state of the art document. The document cites a system against flood disasters applied to hydroelectric plants.

The present utility model was developed preferably to operate intake valves of hydroelectric power plants. It was developed as an improvement of the current process, with pneumatic actuation generated by two pneumatic pumps mounted in parallel in the hydropneumatic block.

The actuator, oil reservoir and controls are assembled as a hydropneumatic system that is installed at the operating site. It is only necessary to carry a compressed air hose and the power connection to operate the solenoid valve.

The objectives of this patent application are:

a. Develop a hydraulic actuator with dual pneumatic operation to be applied in intake valve operations in hydroelectric power plants;
b. Reduce and optimize the elements required to manufacture a drive means for hydroelectric power plants;
c. Reduce the production costs of a drive means for hydroelectric power plants;
d. Reduce the environmental impact due to lower oil consumption of a drive means for hydroelectric power plants; and
e. Reduce the energy consumption required for a drive means for hydroelectric power plants.

BRIEF DESCRIPTION OF THE DRAWINGS

The attached drawings show the hydropneumatic actuator applied as a drive for hydroelectric power plants, which together with the numerical references detailed below, is more easily understood, although this invention can vary in many different constructive forms, always customized for each application, not shown in the drawings that will be described here in detail and ways to carry out the referred improvement.

DESCRIPTION OF THE UTILITY MODEL

Figure 1:
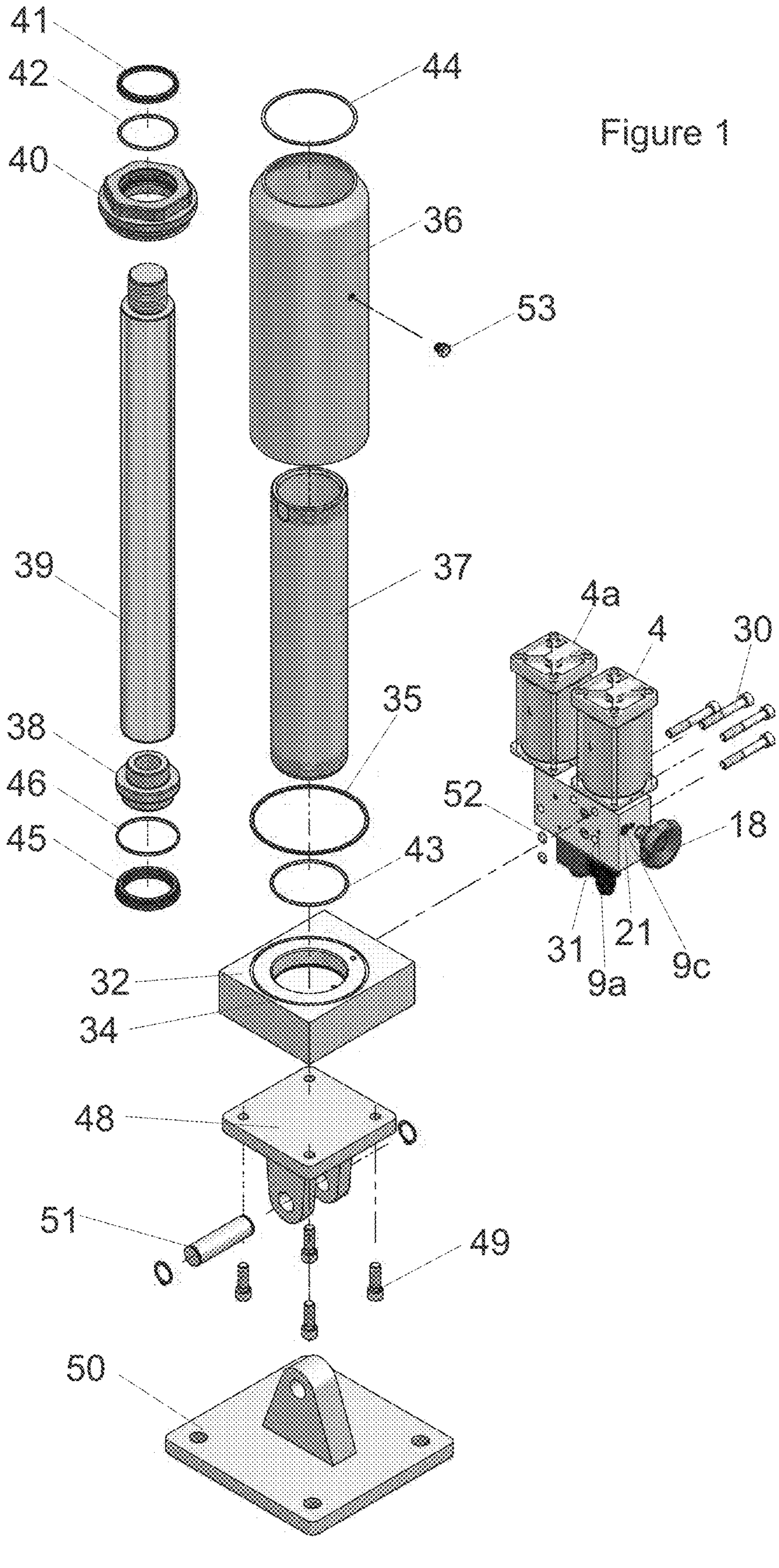
FIG. 1 shows an exploded perspective view.
Figure 2:
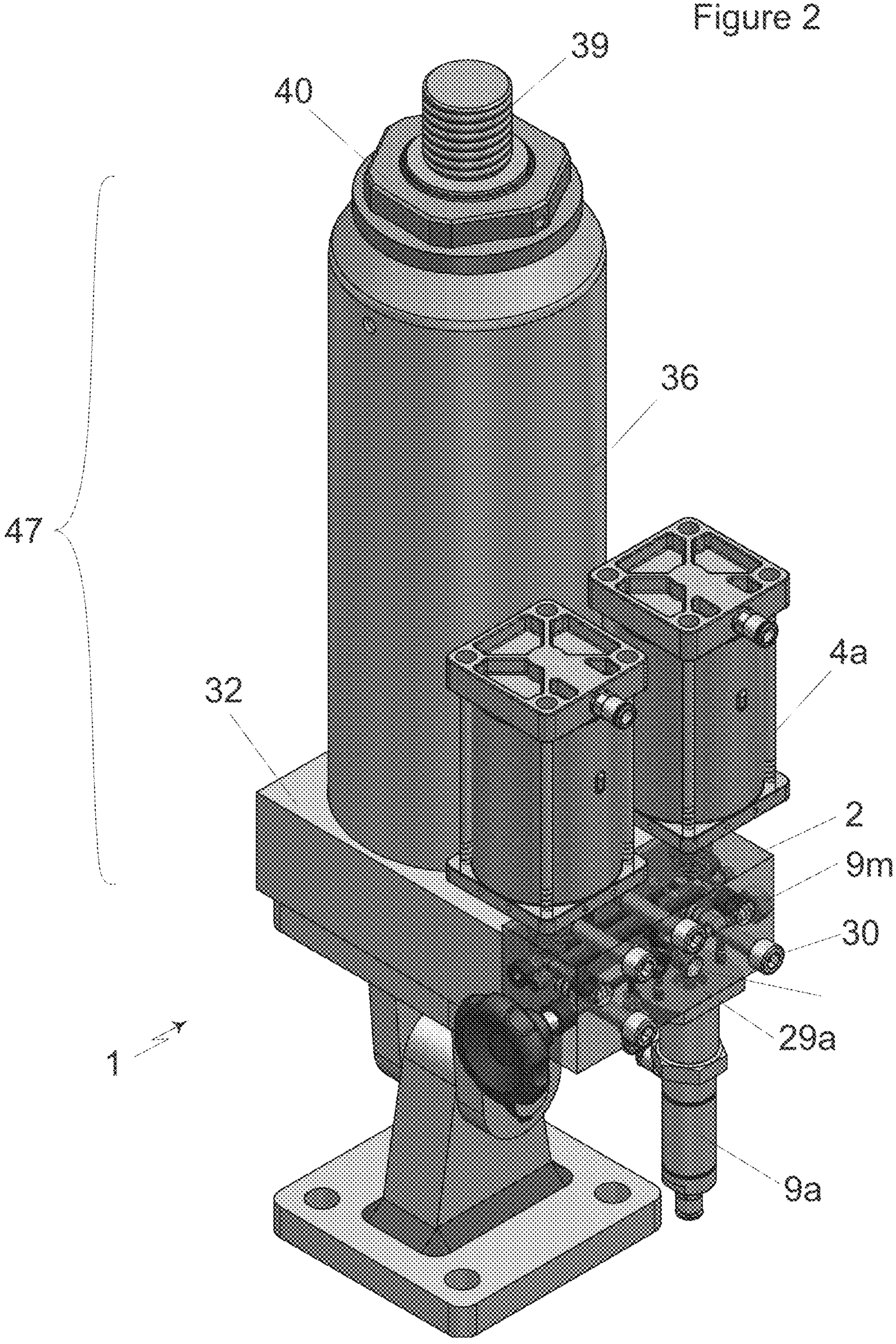
FIG. 2 illustrates a view of the assembled hydropneumatic actuator.
Figure 3:
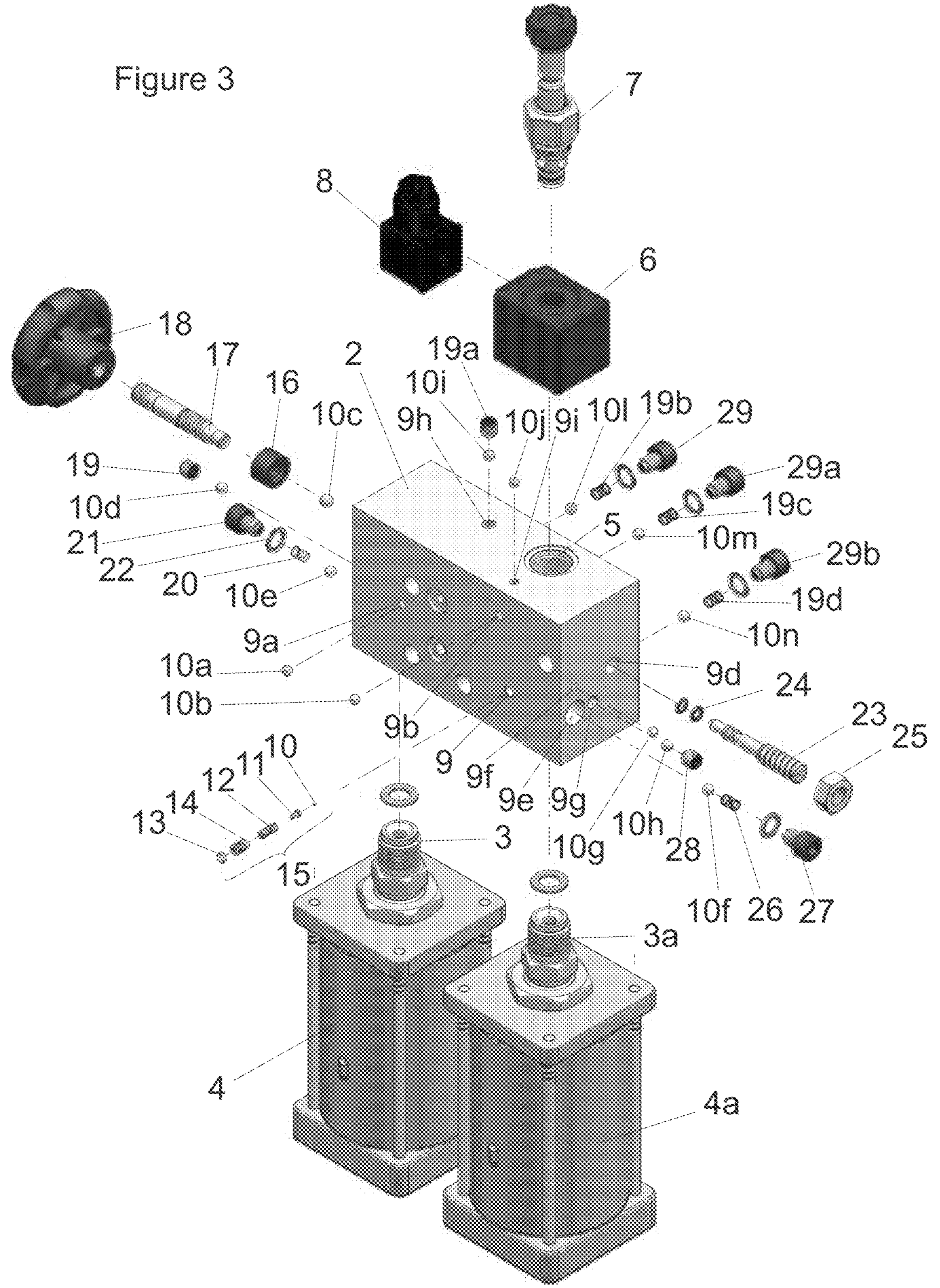
FIG. 3 shows an exploded view of the hydropneumatic block.
Figure 4:
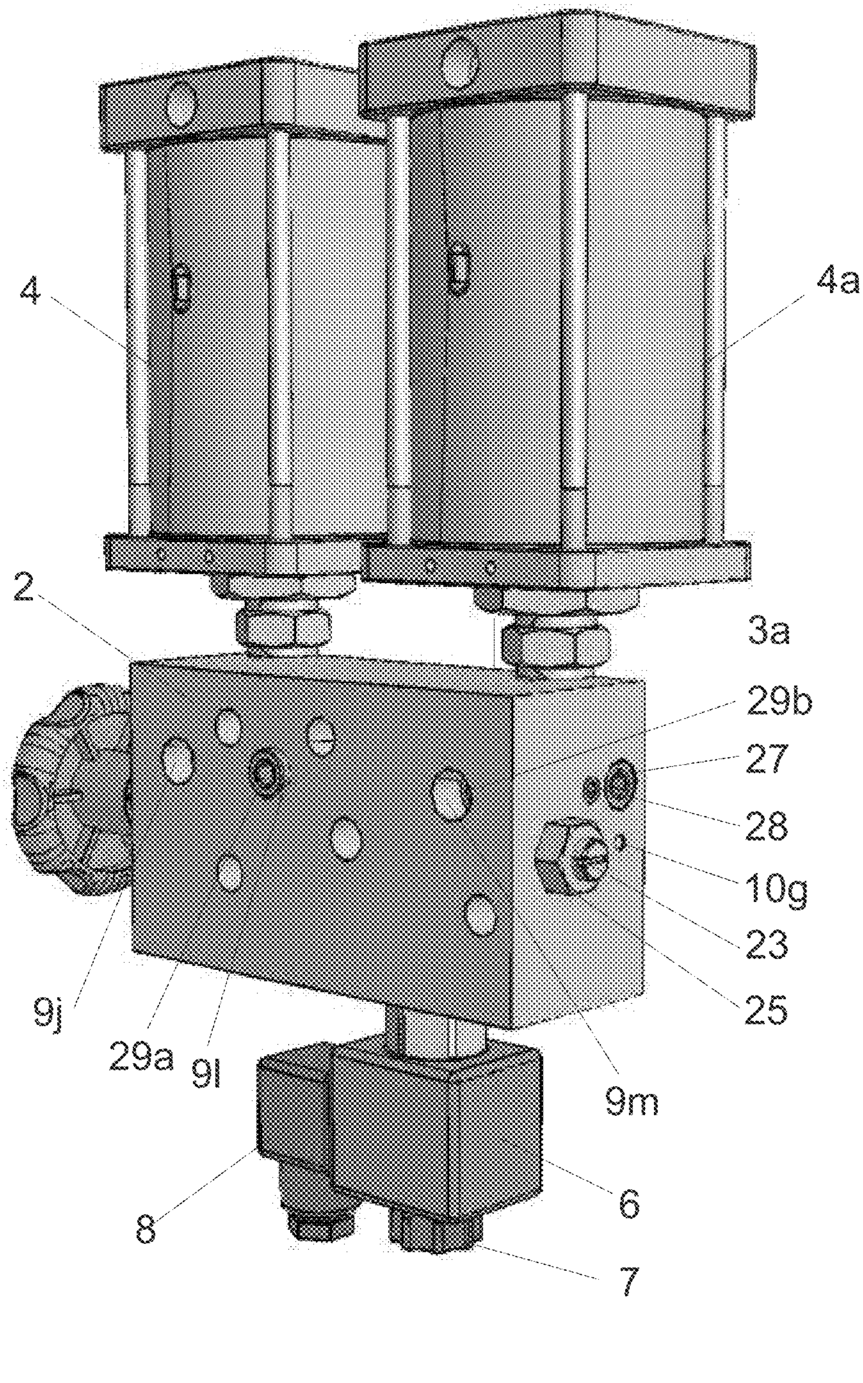
FIG. 4 shows a view of the assembled hydropneumatic block.
Figure 5:
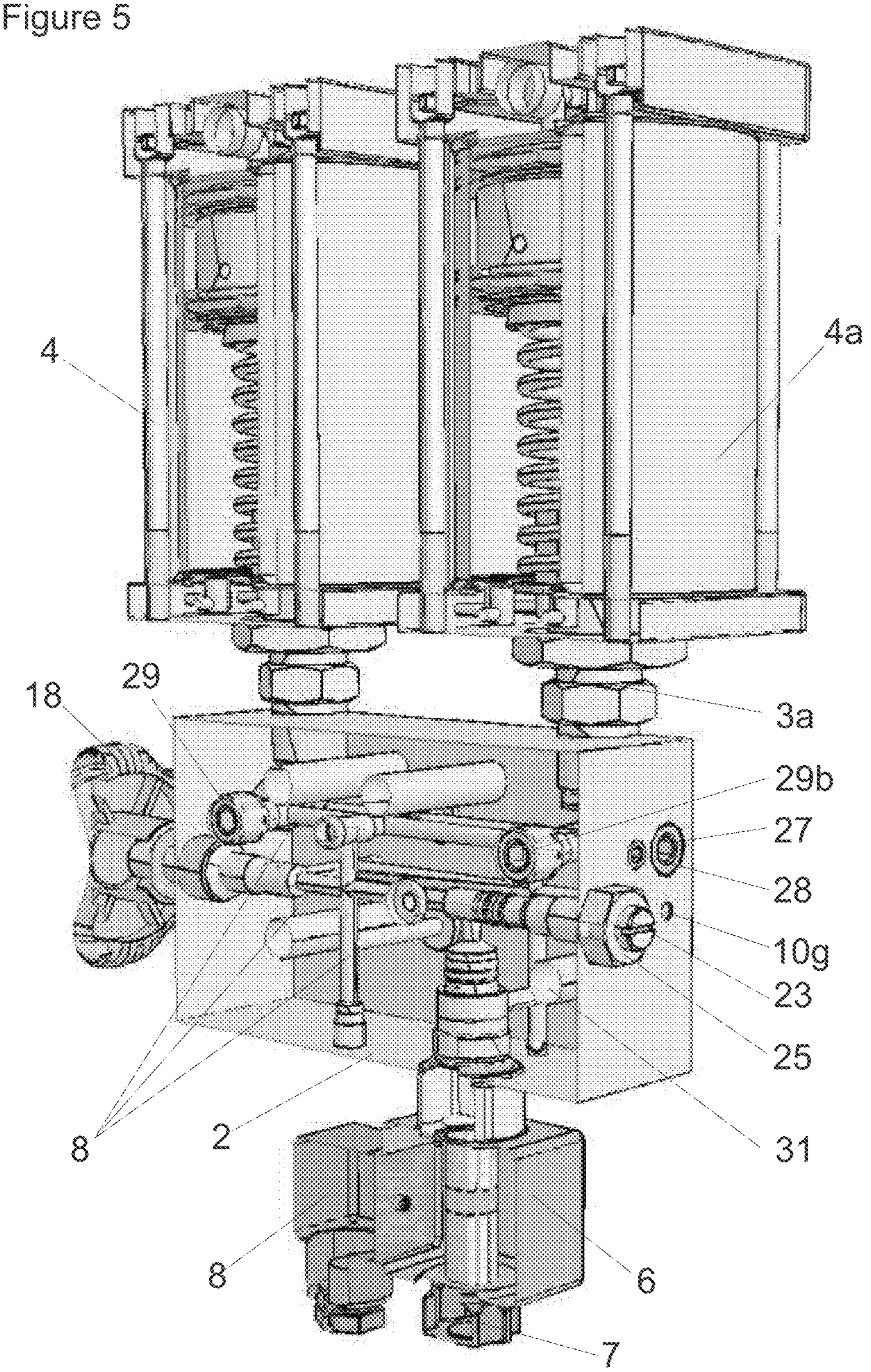
FIG. 5 shows a view of the assembled hydropneumatic block in partial section.

According to the attached figures, the hydropneumatic actuator is generally indicated by the number reference (1), being characterized by a cube-shaped hydropneumatic block (2) that has several holes on all six faces, these holes being internal interconnection points between the channels with valve systems that release or prevent the passage of oil.

The cube-shaped hydropneumatic block (2) houses the control elements and makes the necessary hydraulic connections.

The hydropneumatic block (2) receives on its lower surface the fitting and fixing of the outlets (3 and 3*a*) of the two pneumatic pumps (4 and 4*a*) aligned parallel to each other.

The two pneumatic pumps (4 and 4*a*) operate in drive synchrony, increasing the speed of the hydraulic actuator drive (47).

The hydropneumatic block (2) receives a hole (5) on its lower face, circular with a depth until it connects to the high-pressure line, for fitting the coil (6) of the 2-way, 2-position directional hydraulic seat valve (7), laterally mounted next to the electrical connector (8) of the electrical connection of the electric coil (6) responsible for the electric actuation of the directional hydraulic seat valve (7).

On the upper side, there is also a hole (9*h*) to house the ball (10*i*) locked by an Allen screw (19*a*), and a hole (9*i*) for housing the ball (10*j*).

The hydropneumatic block (1) receives a passage hole (9) on its front face for mounting the ball (10), such ball being mounted on the guide pin (11), the pin, by its turn, being pressured by the compression spring (12), the spring being supported on the sealing ring (13) which is locked by the screw (14) forming the relief valve assembly (15) responsible for limiting the operating pressure of the system.

The compression spring (12) exerts pressure on the guide pin (11) which transfers it to the ball (10), this condition that seals the passage of oil through the hole and opens when the force resulting from the oil pressure overcomes the force of the spring (12).

The pressure of the compression spring (12) is regulated by the relief valve screw (14) which sets the opening pressure.

The hole (9*a*) and the hole (9*b*) receive, respectively, the ball assembly (10*a*) and the ball (10*b*) used for static and dynamic sealing.

On the left side, the hydropneumatic block (2) receives the ball assembly (10*c*) housed in the closure retainer (16), which fits into the threaded closing screw (17) operated by a handle (18).

The closure retainer (16) works to seal the closing screw (17) responsible for activating the ball (10*c*) that closes the hole (9*c*) for the oil passage.

The closing screw (17) is turned manually by means of a handle (18) which, depending on the direction of rotation, opens or closes the oil passage.

Further closure occurs by means of the tightening pressure exerted by the Allen screw (19) on the ball (10*d*).

The ball (10*e*) is pressed by the fisherman's spring (20) which fits into the fastening screw (21) with sealing washer (22).

On the right side, the regulator screw (23) is mounted with a sealing ring (24), which fits into the hole (9*d*), receiving the nut threading (25) at the opposite end.

The nut (25) has the function of locking the position of the regulator screw (23) that regulates the oil flow.

Still on the right side, in the hole (9*e*), the ball (10*f*) is assembled, pressed by the fisherman's spring (26), fitted and locked by the fastening screw (27).

Another hole (9*f*) is for ball fitting (10*g*) and the hole (9*g*) is for fitting the ball (10*h*) retained by the screw (28).

The back face features a socket hole (9*j*) and ball assembly (101) fitted and pressed by spiral spring (19*b*) retained by the Allen screw (29).

The socket hole (91) and ball assembly (10*m*) fitted and pressed by the spiral spring (19*c*) retained by the screw (29*a*).

The socket hole (9*m*) and ball assembly (10*n*) fitted and pressed by the spiral spring (19*d*) retained by the screw (29*b*).

The front face is oriented towards the base (32) to be fixed by larger screws (30) that pass through the longitudinal tunnels (31) of the hydropneumatic block (2).

Between the base assembly (32) and the hydropneumatic block (2) the o-rings (52) are placed to seal the oil channels between the hydropneumatic block (2) and the hydraulic actuator (47).

The hydropneumatic block (2) in its inner part is endowed with a plurality of tubes (33), these tubes interconnecting together with the valve sets, releasing or blocking the passage of air and oil.

The rectangular base (32) features a circular channel (34) fitting the flat ring (35) sealing the cup (36) that accommodates inside the plunger (38) guide housing cylinder (37) fitted to the shaft end (39) that transfers the force of the plunger (38) to an external connection.

The shaft (39) travels on the inside of the cylinder (37) due to pressure creating a resultant force.

The shaft (39) is fixed and locked at the end of the cup (36) by means of a guide nut (40) that also holds the ring (42) and the scraper (41) that prevents contaminants from entering the hydraulic actuator (47).

The cup (36) is an oil reservoir and receives on its side the plug assembly (53) responsible for closing the oil supply nozzle.

The sealing ring (43) seals the cylinder (37) at the base (32).

The fiber ring (44) seals the cup (36) against the guide nut (40).

The shaft gasket (45) is used to seal the plunger (38).

The anti-extrusion ring (46) prevents extrusion of the shaft gasket (45).

The base (32) is attached to the female eyelet (48) by means of screws (49).

The female eyelet (48) is fitted, retained and hinged in the male eyelet (50) by means of a pin (51).

The tilt joint that occurs between the female eyelet (48) and the male eyelet (50) allows the entire hydraulic actuator (47) and the hydropneumatic block (2), which is attached to it, to move at tilt angles during the shaft drive (39).

That is, the tilt joint of the hydropneumatic block (2) with two pneumatic pumps (4 and 4*a*) fixed to the hydraulic actuator (47) occurs at the pin (51) that joins and articulates the female eyelet (48) in the male eyelet (50).

The invention claimed is:

1. A hydraulic actuator with dual pneumatic operation for hydroelectric power plants comprising:

- a hydraulic actuator drive (47) comprising a base (32) for mounting a cup (36) housing a cylinder (37) of a piston guide which in turn houses a shaft (39) fixed and locked to the mounting cup at an end by means of a guide nut (40); and
- a hydropneumatic block (2), wherein the hydropneumatic block comprises:
  - a fitting and fixing outlets (3 and 3*a*) of two pneumatic pumps (4 and 4*a*) aligned parallel to each other;
  - a circular hole (5) with a depth that connects to a high-pressure line, for fitting a 2-way electric coil (6), a 2-position directional hydraulic seat valve (7), side-mounted next to an electrical connector (8), wherein the electrical connector (8) is an electrical connection of the 2-way electric coil (6) for an electric actuation of the 2-position directional hydraulic seat valve (7);
  - a first hole (9H) having a first ball housing (10*i*) locked by a first allen screw (19*a*) and a second ball housing (10*j*) in a second hole (91);

a first passage hole (9) on its front face for mounting a first passage ball (10), such first passage ball being mounted on a first guide pin (11), wherein the first guide pin is pressured by a first compression spring (12), said first compression spring being supported on a first sealing ring (13) which is locked by a first relief valve screw (14) forming a first relief valve assembly (15) responsible for limiting the operating pressure of the system;

a pressure of the first compression spring (12) is regulated by the first relief valve screw (14);

a third hole (9*a*) and a fourth hole (9*b*) receive, respectively, a third ball (10*a*) and a fourth ball (10*b*) used for static and dynamic sealing;

a first ball assembly (10*c*) housed in a closure retainer (16) on a side of the hydropneumatics block (2), which fits into a threaded closing screw (17) operated by a handle (18), wherein the closure retainer (16) seals the closing screw (17) which is responsible for activating the first ball assembly (10*c*) that closes an oil passage hole (9*c*);

wherein a closure occurs by means of the tightening pressure of a second allen screw (19) on a fifth ball (10*d*);

a sixth ball (10*e*) is pressed by a first spring (20) which fits into a first fastening screw (21) with a sealing washer (22);

a regulator screw (23) with a second sealing ring (24) fits into a fifth hole (9*d*) and receives a nut threading at its opposite end (25) to lock a position of the regulator screw (23) that regulates the oil flow;

a second ball assembly (10*f*) is pressed by a second spring (26) fitted and locked by a second fastening screw (27) into a sixth hole (9*e*);

an eighth ball fitting (10*g*) into a seventh hole (9*f*), and a ninth ball fitting (10*h*) into an eighth hole (9*g*) retained by a third allen screw (28);

a first socket hole (9*j*) and a second ball assembly (101) are fitted and pressed by a first spiral spring (19*b*) retained by a third fastening screw (29);

a second socket hole (9*l*) and a third ball assembly (10*m*) are fitted and pressed by a second spiral spring (19*c*) retained by a fourth fastening screw (29*a*);

a third socket hole (9*m*) and a fourth ball assembly (10*n*) are fitted and pressed by a third spiral spring (19*d*) retained by a fifth fastning screw (29*b*);

O-rings (52) for sealing oil channels between the hydropneumatic block (2) and the hydraulic actuator drive (47);

wherein the base (32) is fixed by a set of screws (30) that pass through longitudinal tunnels (31) of the hydropneumatic block (2).

2. The hydraulic actuator with dual pneumatic operation for hydroelectric power plants according to claim 1, wherein the base of the hydraulic actuator drive (47) is a rectangular base (32) having a circular channel (34) fitting a flat ring (35) which seals the cup (36) that houses the cylinder (27) and a plunger (38) fitted to the shaft (39) that transfers the force of the plunger (38) to an external connection;

the shaft (39) holds a ring (42) and a scraper (41);

the cup (36) is an oil reservoir with a closing plug (53) closing an oil supply nozzle;

a third sealing ring (43) sealing the cylinder (37) at the base (32);

a fiber ring (44) sealing the cup (36) against the guide nut (40);

a shaft gasket (45) sealing the plunger (38);

an anti-extrusion ring (46) preventing extrusion of the shaft gasket (45);

wherein the base (32) is attached to a female eyelet (48) by means of screws (49);

the female eyelet (48) is fitted, retained and hinged in a male eyelet (50) by means of a pin (51).

3. The hydraulic actuator with dual pneumatic operation for hydroelectric power plants according to claim 1, wherein the pneumatic pumps (4 and 4*a*) operate in drive synchrony.

4. The hydraulic actuator with dual pneumatic operation for hydroelectric power plants according to claim 1, wherein the hydropneumatic block (2) has a plurality of tubes (33) that interconnect and that, together with valve sets, releases or blocks air passage.

* * * * *